(12) United States Patent
Merz et al.

(10) Patent No.: US 8,794,066 B2
(45) Date of Patent: Aug. 5, 2014

(54) MICROMECHANICAL CORIOLIS RATE OF ROTATION SENSOR

(75) Inventors: Peter Merz, Beldorf (DE); Manfred Weiss, Itzehoe (DE)

(73) Assignee: Fraunhofer-Gesellschaft zur Foerderung der Angewandten E.V., Munich (DE)

( * ) Notice: Subject to any disclaimer, the term of this patent is extended or adjusted under 35 U.S.C. 154(b) by 433 days.

(21) Appl. No.: 13/128,709

(22) PCT Filed: Nov. 11, 2009

(86) PCT No.: PCT/EP2009/064984
§ 371 (c)(1),
(2), (4) Date: Jul. 25, 2011

(87) PCT Pub. No.: WO2010/055055
PCT Pub. Date: May 20, 2010

(65) Prior Publication Data
US 2012/0017677 A1 Jan. 26, 2012

(30) Foreign Application Priority Data
Nov. 11, 2008 (EP) .................................. 08168846

(51) Int. Cl.
*G01C 19/56* (2012.01)
*G01C 19/5719* (2012.01)
*G01C 19/5755* (2012.01)
*G01C 19/5712* (2012.01)
*G01C 19/574* (2012.01)

(52) U.S. Cl.
CPC ........ *G01C 19/5719* (2013.01); *G01C 19/5755* (2013.01); *G01C 19/5712* (2013.01); *G01C 19/574* (2013.01)
USPC ...................................................... 73/504.12

(58) Field of Classification Search
CPC .................... G01C 19/5719; G01C 19/5755
USPC ........................................................ 73/504.12
See application file for complete search history.

(56) References Cited

U.S. PATENT DOCUMENTS 8,256,290 B2 * 9/2012 Mao ............................ 73/504.12
8,261,614 B2 9/2012 Hartmann et al.
(Continued)

FOREIGN PATENT DOCUMENTS

DE 102006016260 A1 10/2007
DE 102007012163 A1 10/2007
(Continued)

OTHER PUBLICATIONS

Hoekstra, Frank; International Search Report; European Patent Office; Dec. 15, 2009.
(Continued)

*Primary Examiner* — John Chapman, Jr.
(74) *Attorney, Agent, or Firm* — Stevens & Showalter, L.L.P.

(57) ABSTRACT

The invention relates to a micromechanical Coriolis rate of rotation sensor for detecting rates of rotation with components around measuring axes in three spatial directions which are orthogonal to one another. The Coriolis rate of rotation sensor has a substrate, a detection mass and at least two drive masses, wherein the drive masses can each be driven to perform a primary movement relative to the substrate. The direction of the primary movement of one of the at least two drive masses is perpendicular to the direction of the primary movement of another of the at least two drive masses. The detection mass is coupled to the drive masses. The invention also relates to an Inertial Measurement Unit (IMU) and to a method for detecting rates of rotation in three spatial directions which are orthogonal to one another.

20 Claims, 6 Drawing Sheets

(56) References Cited

U.S. PATENT DOCUMENTS

| | | | |
|---|---|---|---|
| 8,347,717 B2 * | 1/2013 | Seeger et al. | ............ 73/504.12 |
| 8,546,928 B2 | 10/2013 | Merz et al. | |
| 2007/0266785 A1 | 11/2007 | Cadarelli | |

FOREIGN PATENT DOCUMENTS

| EP | 1775551 A1 | 4/2007 |
|---|---|---|
| WO | 92/21000 A1 | 11/1992 |

OTHER PUBLICATIONS

M. Traechtler et al.; "Novel 3-Axis Gyroscope on a Single Chip using SOI-Technology"; Inertial Sensors & Systems, HSG-IMIT; pp. 124-127; Oct. 23, 2008; Villingen-Schwenningen, Germany.

* cited by examiner

MICROMECHANICAL CORIOLIS RATE OF ROTATION SENSOR

FIELD OF THE INVENTION

The present invention relates to a micromechanical Coriolis rate of rotation sensor for detecting rates of rotation with components about measurement axes in three mutually orthogonal spatial directions (X, Y and Z axis), the sensor having a substrate, a detection mass and at least two drive masses, the drive masses each being able to be driven relative to the substrate to provide a primary movement and the detection mass being mechanically coupled to the drive masses in such a manner that the detection mass, due to a secondary movement of the drive masses due to Coriolis force under the action of an external rate of rotation to be detected, can be excited to produce a detection movement.

BACKGROUND OF THE INVENTION

Coriolis rate of rotation sensors are generally known from the prior art. They serve to measure an external rotational rate of a body or a system about one or two axes. The axis or the axes is/are defined relative to the body or system to be measured and described by means of a coordinate reference system, that is to say, in the case of two axes, orientated orthogonally relative to each other. The axes are also generally referred to as measurement axes. Coriolis rate of rotation sensors use the Coriolis forces which occur during rotation about a measurement axis on a moved spring/mass system.

Due to miniaturisation and low production costs, acceleration sensors (for detecting linear accelerations) produced using MEMS technology are being increasingly widely used. Whilst MEMS acceleration sensors are already produced in large quantities and are comparable in terms of performance with components produced using conventional technologies, the system construction and the corresponding process technology must be far more sophisticated in rate of rotation sensors owing to the very small force relationships. This explains why there are already known for acceleration sensors numerous MEMS designs which can not only detect inertial movements in the direction of one spatial axis but which are instead sensitive in two or three dimensions, that is to say, in the direction of all the spatial axes. For rate of rotation sensors, the implementation of 3D sensitivity in a MEMS component is complex since various drive and sense modes must be excited and read in a controlled manner. The mechanical and electrical crosstalk of the drive in the sense mode on the one hand and the crosstalk of the individual sense modes between each other is intended to be suppressed.

DE 10 2007 012 163 A1 discloses a rate of rotation sensor and a method for the production thereof. The rate of rotation sensor comprises a substrate which is orientated in the XY plane of a reference coordinate system, at least two base elements and reading devices. The base elements themselves each comprise a frame, a suspension of the frame on the substrate, at least one seismic mass, a suspension of the seismic mass on the frame and drive means for driving the base elements. The base elements are connected to each other by means of at least one coupling bar which is arranged on the substrate. Due to the arrangement of the coupling bar on the substrate, the movement possibilities thereof relative to the substrate are defined, such as, for example, degrees of freedom of its movement are reduced, so that disruptive deflections or parasitic oscillations of the seismic masses are reduced or suppressed via the connection with the coupling bar. The rate of rotation sensor disclosed is suitable for detecting rates of rotation about one or two spatial axes. A detection of rates of rotation in all three spatial directions is not possible with this rate of rotation sensor according to the prior art.

EP 1775551 A1 discloses a rate of rotation sensor which is constructed in a silicon wafer by means of MEMS technology. It has an annular region which is suspended on a central region by means of eight resilient bar elements. The annular region can carry out primary and secondary vibrations about the central suspension. The primary vibration is excited by actuation electrodes in a $\cos 2\theta$ mode. When an external rate of rotation $\Omega$ acts about an axis perpendicularly relative to the annular region, there is produced a Coriolis force which in turn produces a secondary vibration in the $\sin 2\theta$ mode. It is only possible to detect an external rate of rotation about one axis of rotation with this rate of rotation sensor according to the prior art.

US 2007/0266785 A1 discloses a rate of rotation sensor for detecting rotation about a detection axis (Y axis). It has a support structure and two masses which are flexibly connected to the support structure in such a manner that they can carry out movements in two opposite directions along a drive axis perpendicularly to the detection axis. A Coriolis force, which results in a deflection or detection movement about the detection axis, acts on the moved masses in accordance with the direction of rotation of the external rate of rotation to be detected. The rate of rotation sensor disclosed detects an external rate of rotation in a direction perpendicular to the drive axis. It is not possible to detect external rates of rotation with components in three spatial directions (3D sensor) with this rate of rotation sensor.

In order to be able to detect rates of rotation in all three spatial directions or rates of rotation with components in all three spatial directions, it is known from the prior art to combine a plurality of one-dimensional or two-dimensional individual sensors to form an inertial measurement unit (IMU). There are constructed rate of rotation sensors for detecting rates of rotation in one direction, that is to say, one-dimensional individual sensor elements (sensor chips), or in two directions (two-dimensional individual sensor elements) in a state combined on a chip or printed circuit board plane or in a corresponding sensor housing, which is also referred to as hybrid construction or sensor cluster. A disadvantage in inertial measurement units with hybrid construction or a combination of a plurality of different individual sensor designs at the chip level is the relatively complex production and the relatively high spatial requirement because it is necessary to provide a corresponding individual sensor structure having drive masses, detection units, drives and detection systems for detecting rates of rotation in the different spatial directions.

A method for producing such a hybrid construction is known, for example, from DE 10 2006 016260 A1. There is provided a wafer having corresponding active structures, for example, one or two-axis individual sensors which are inherently independently functional, and housed with a cap wafer which has cavities or recesses for the individual sensors. A Coriolis rate of rotation sensor which is suitable for detecting rates of rotation in three spatial directions and a method for the production thereof is disclosed in "Novel 3-Axis Gyroscope on a Single Chip using SOI Technology" by M. Traechter, T. Link, J. Dehnert, J. Auber, P. Nommensen and Y. Manoli, Inertial Sensors and Systems, HSG-IMIT, Villingen-Schwennigen, Germany. The publication describes a sensor cluster, in which a conventional out of plane sensor (sensor in which the detection axis projects out of the substrate plane) is combined with two in plane sensors (sensor in which the detection axis is in the substrate plane) in order to produce a sensor unit which is suitable for detecting rates of rotation in three spatial directions. As a result, the sensor unit described has three individual sensor elements which are inherently independently functional and which detect a rate of rotation in a specific assigned spatial direction (X, Y or Z). The term inherently functional means that each individual sensor element has all the functional units necessary for detecting the respective assigned rate of rotation, such as drive masses, detection masses, drive units or drive electrodes and detection units or detection electrodes. The correspondingly high number of functional units contains specific disadvantages, such as high production costs, great production complexity, in particular complex assembly, often problematic coordination of the individual sensor elements with respect to each other, complex housing and large dimensions. Those particular disadvantages and the implementation of a plurality of individual sensor elements which each detect an assigned rate of rotation in a specific spatial direction are intended to be avoided with the present invention.

WO 92/21000 discloses a micromechanical Coriolis rate of rotation sensor having a support structure which is rotatably suspended about a Z axis and on which in turn four seismic masses are arranged offset through 90° about the Z axis by means of flexible bars. The sensor can detect rotational oscillations about all three spatial axes. Rotations about the X and Y axis are detected by a displacement of the seismic axes themselves, rotations about the Z axis by means of a rotation thereof transmitted by the seismic masses to the support structure.

SUMMARY OF THE INVENTION

Based on the prior art described above, the problem addressed by the present invention is to provide a micromechanical Coriolis rate of rotation sensor and a method which is suitable for detecting, in particular simultaneously detecting, rates of rotation or rate of rotation components which are freely orientated relative to the sensor in three-dimensional space, the necessary functional units at the sensor level being integrated in the sensor, the spatial requirement which is necessary in relation to sensor systems according to the prior art being as small as possible, the number of functional units necessary for detecting rates of rotation in all three spatial directions, such as excitation masses, drive units, detection units, coupling systems, being reduced and the decoupling between drive modes and detection modes being improved. In particular, the sensor is intended to be able to be produced preferably from one substrate with the smallest possible number of etching steps.

The solution to the above-described problem involves a micromechanical Coriolis rate of rotation sensor for detecting rates of rotation with components about measurement axes in three mutually orthogonal spatial directions (X, Y and Z axis), having: a substrate, a detection mass and at least two drive masses, the drive masses each being able to be driven relative to the substrate to provide a primary movement, the direction of the primary movement of one of the at least two drive masses being perpendicular to the direction of the primary movement of another of the at least two drive masses, the detection mass being coupled to the drive masses in such a manner that the detection mass, due to a secondary movement of the drive masses due to Coriolis force under the action of an external rate of rotation to be detected, can be excited to perform a detection movement, and the detection mass can carry out, relative to the substrate as a detection movement, rotational oscillations about axes of rotation in the three mutually orthogonal spatial directions (spatial axes X, Y, Z).

The above problem is further solved by an inertial measurement unit according to claim 14 and a method according to claim 15.

The Coriolis rate of rotation sensor according to the invention is preferably produced with a surface micromechanical process or a similar method, as described in P. Merz, W. Reinert, K. Reimer, B. Wagner, "PSM-X2: Polysilicon surface micromachining process platform for vacuum-packaged sensors", KonferenzbandMikrosystemtechnik-Kongress 2005, D/Freiburg, VDE Verlag, pages 467-470, in particular from a preferably integral substrate.

During the description of the Coriolis rate of rotation sensor according to the invention, the Cartesian coordinate system illustrated in FIG. 1 is used with the following term definitions indicated in FIG. 1 in order to improve comprehension:

X, Y, Z: spatial axes
$V_X, V_Y, V_Z$: velocity vectors in a positive direction of the X, Y, or Z axis
$\Omega_X, \Omega_Y, \Omega_Z$: external rate of rotation about the X, Y or Z axis
$\theta_X, \theta_Y, \theta_Z$: angle of rotation about the X, Y or Z axis The origin of the coordinate system is at the pivot point of the units of the sensor moved relative to the substrate, for example, the detection mass or drive mass. In the present description of the invention, the coordinate system is orientated by way of example in such a manner that the X and Y axis thereof are arranged parallel with and within the substrate plane, whereas the Z axis extends orthogonally relative to the substrate plane. A different orientation of the co-ordinate system relative to the sensor and the rates of rotation, etc., is naturally possible, for which reason no limitations to the invention arise from the orientation selected.

With the Coriolis rate of rotation sensor according to the invention, it is advantageously possible to detect external rates of rotation independently of their orientation relative to the sensor in all directions of space. This is possible with the individual sensor element according to the invention alone, without additional sensor units being necessary to detect rates of rotation in specific spatial directions. In particular—unlike in sensor units described with reference to the prior art in which a three-axis sensor is formed by implementing one and two-axis sensors at the chip or printed circuit board level as a sensor cluster—the functional units of the sensor, such as drive and detection masses and optionally connection elements between them and with respect to the substrate, are integrated in the sensor at the sensor level. The sensor is in the form of an individual sensor element which means that all the detection and drive masses necessary for detecting any rates of rotation orientated in the three spatial directions are arranged on one preferably integral substrate. The sensor according to the invention is an authentic three-axis Coriolis rate of rotation sensor which is distinguished from sensor clusters according to the prior art by a small structural space, advantageous production costs and simple production.

According to an aspect of the present invention, the rate of rotation sensor has a substrate, a detection mass and at least two drive masses. The sensor preferably has a single detection mass, with which any freely orientated external rate of rotation can be detected. The substrate of the rate of rotation sensor is connected to the system to be measured directly or indirectly when it is used according to provisions and forms a reference system, for which the external rates of rotation to be detected are established (corresponding to the coordinate system used for the description).

The drive masses can be driven relative to the substrate to perform a primary movement and carry it out at least during a measurement operation or permanently. The primary movement is preferably a translatory oscillation but can also be a circular movement. The detection mass is coupled to the drive masses, preferably mechanically coupled thereto, for example, by means of mechanical connection elements, in particular by means of resilient elements. In principle, the connection serves to transmit movements of the drive masses relative to the substrate and reference system or components thereof to the detection mass as desired. Due to the primary movement of the drive masses relative to the substrate, there are Coriolis forces acting on the drive masses when an external rate of rotation acts in accordance with the orientation thereof relative to the substrate and reference coordinate system. Those Coriolis forces cause a secondary movement of the drive masses which is transmitted to the detection mass due to the connection, that is to say, by means of the resilient elements, between the detection mass and the drive masses. Due to the transmission of the secondary movement of the drive masses to the detection mass, the detection mass is excited to carry out a detection movement whose magnitude and direction are dependent on the magnitude and orientation of the external rate of rotation. The sensor according to the invention is constructed in such a manner that the primary movements of the drive masses bring about, when the entire sensor is rotated about each of the three spatial axes, Coriolis forces which again produce secondary and detection movements.

The rate of rotation sensor according to the invention is constructed in such a manner that the direction of the primary movement of one of the at least two drive masses (referred to below as the first drive mass) is perpendicular to the direction of the primary movement of another of the at least two drive masses (referred to below as the second drive mass). The first drive mass can carry out, for example, a primary movement in the X direction, in which case the second drive mass carries out a primary movement perpendicular thereto in the Y direction. The primary movements of the two drive masses are orthogonal to each other in the XY plane. If an external rate of rotation is present, torques caused by the Coriolis effect act on the respective drive masses. For instance, an external rate of rotation about the X axis results in the above case in Coriolis forces which act on the second drive mass and which bring about secondary movements of the second drive masses. However, an external rate of rotation about the X axis does not cause secondary movement of the first drive mass because the direction of the primary movement thereof is parallel with the direction of the external rate of rotation and consequently the Coriolis force according to the formula $$F_{cor}=2m(v \times \Omega)$$

$F_{cor}$ Coriolis force
m mass of the drive mass
$\Omega$ external rate of rotation
V velocity of the drive mass
has a value of zero as a cross-product of the external rate of rotation with the primary velocity of the first drive mass.

Similarly, an external rate of rotation about the Y axis results in Coriolis forces which act on the first drive mass and which again bring about secondary movements of the first drive mass. An external rate of rotation about the Y axis does not bring about Coriolis forces acting on the second drive mass owing to the relationships (cross-product) set out above, for which reason the drive mass is not excited to produce secondary movements.

Finally, an external rate of rotation in the Z direction brings about Coriolis forces both on the first and on the second drive mass. If the primary movements of the drive masses correspond to each other accordingly in terms of type and direction, the Coriolis forces become combined to form a torque which acts about the Z axis in the clockwise or counter-clockwise direction in accordance with the direction of rotation. Consequently, the drive masses are excited to produce secondary movements about the Z axis in the clockwise or counter-clockwise direction.

Since the drive masses according to the invention each carry out a primary movement which is orientated orthogonally relative to the primary movement of another drive mass, an external rate of rotation brings about a corresponding reaction in the form of a secondary movement of the first and/or second drive mass(es) irrespective of the orientation thereof in space and orientation relative to the sensor. The secondary movement(s) bring(s) about, owing to the connection between the detection mass and drive masses, detection movements of the detection mass which it carries out relative to the substrate. According to the invention, the detection mass is constructed in such a manner that it can carry out as the respective detection movement a rotational oscillation about each of the three axes of the reference coordinate system (in the three mutually orthogonal spatial directions X, Y and Z). With the sensor design according to the invention, external rotations of the sensor or the reference system connected to the sensor about all three spatial axes can be detected.

According to a particularly advantageous embodiment of the invention, the Coriolis rate of rotation sensor can have at least four drive masses in each variant. The at least four drive masses are referred to below as the first, second, third and fourth drive mass. They are arranged relative to each other and connected to each other in such a manner that in each case two drive masses carry out primary movements in phase opposition with an opposing movement direction. The two remaining drive masses also carry out primary movements which are orthogonal thereto in phase opposition with an opposing movement direction. For example, the first drive mass oscillates in a positive X direction whereas the third drive mass oscillates at the same frequency in phase opposition in the negative X direction, the second drive mass oscillating in the positive Y direction and the fourth drive mass oscillating in the negative Y direction at the same frequency in phase opposition. In that manner, the primary movements of the drive masses are not transmitted to the detection mass, or are transmitted only with mutually superimposed and mutually cancelling components, whereby complete mechanical decoupling of the detection modes from the primary movements is obtained, which means that substantially only a transmission of secondary movements is brought about by means of the connection between the drive masses and the detection mass.

According to another embodiment of the invention, there is provision for the detection mass to be arranged on the substrate. The arrangement may be carried out directly or indirectly. In particular, the detection mass can be arranged on the substrate or on a layer which is applied to the substrate by means of an anchoring point. If the detection mass is arranged on the substrate directly or indirectly, the drive masses are not connected directly to the substrate but instead only indirectly by way of the detection mass. Alternatively, it is possible for the drive masses to be arranged respectively on the substrate directly or indirectly and for the arrangement of the detection mass on the substrate to be carried out indirectly by way of the drive masses.

It is advantageous if the detection mass is arranged or articulated so as to be translatory non-movable relative to the substrate. In that case, three degrees of freedom remain for movements of the detection mass, that is to say, in the form of rotational oscillations about the three axes of the coordinate system. Such an arrangement of the detection mass on the substrate can be brought about by means of extremely different bearing structures between the detection mass and the substrate, for example, by means of one or more articulation structure(s) which is/are arranged preferably symmetrically relative to the pivot point of the detection mass. However, it is particularly preferable to have an arrangement of the detection mass by means of an internal suspension, which is at the mass centre thereof, on the substrate or a layer applied to the substrate in the form of a central anchor. The internal suspension preferably comprises resilient structures which centrally connect the detection mass to the substrate indirectly, for example, by means of a centrally arranged pin or anchor element or the like, or directly. The resilient structures preferably exert resistance, individually or together, to relative translation movements of the detection mass relative to the substrate and limit them substantially completely.

Meanwhile, rotational movements about the three axes of the reference coordinate system are possible substantially without any limitation.

An alternative to using a central suspension with resilient elements is a central cardan suspension of the detection mass on the substrate. In such a cardan suspension, a frame element or the like is arranged on the central anchor or suspension point by means of first resilient elements which allow a rotation of the frame element about a first axis. Second resilient elements are again arranged on the frame element orthogonally relative to the first resilient elements and allow rotation orthogonally relative to the direction of rotation of the frame element. The detection mass is again suspended on the second resilient elements. Where applicable, that means that, if the detection mass is only suspended with two degrees of freedom by means of the first and second resilient elements, another frame and another resilient element can be provided for rotation about a third axis so that the detection mass is supported so as to be rotationally movable in three spatial directions by means of such a cardan suspension.

In a particularly advantageous embodiment, the drive masses are arranged around the detection mass, that is to say, starting from the origin of the reference coordinate system radially outside the detection unit. The detection mass and the drive masses are preferably arranged in one plane (in the X-Y plane in the present coordinate system). It is further proposed that two drive masses can be arranged opposite each other with a detection mass interposed, in particular in the case of at least four drive masses. In a particularly simple manner, it is thereby possible to decouple the primary movements from the secondary movements of the drive masses and the detection movements of the detection mass. Primary movements of the drive masses are preferably not transmitted to the detection mass or only transmitted in such a manner that the force components which are introduced into the detection mass owing to primary movements of opposing drive masses preferably cancel each other out completely. Owing to the mutually opposed arrangement of each two drive masses, the secondary movements thereof do not cancel each other out but are instead combined. The secondary movements which are mutually reinforced in this manner excite the detection unit to produce a detection movement which is then evaluated by means of suitable measurement means or detection mechanisms.

The connection between the drive masses and the detection mass is preferably constructed in such a manner that, although the secondary movements are transmitted to the detection mass, the primary movements of the drive masses are not, and can excite it to carry out a detection movement. In other words, a mechanical decoupling of the detection movements (sense modes) from the respective primary movement(s) (drive modes) present is brought about owing to the specific construction of the mechanical connection structure. Owing to the connection, the degrees of freedom of each drive mass are also defined and adjusted relative to the detection mass in addition to the defined transmission of movements of the drive masses to the detection mass. Advantageously, the connection is brought about in such a manner that at least one drive mass can carry out its primary movement in a radial direction in an unimpeded manner. With regard to the secondary movement, according to another proposal of the invention, the connection is intended to be constructed in such a manner that the drive mass can carry out two rotational secondary movements in mutually orthogonal spatial directions relative to the detection axis. In a particularly advantageous manner, a rotational secondary movement of the drive mass about a spatial direction parallel with the primary movement is substantially prevented by the connection.

According to another proposal of the invention, each drive mass is connected to the detection mass by means of at least one resilient element, in particular by means of two resilient elements. In a particularly advantageous manner, at least one drive mass, preferably each drive mass, is in each case connected to the detection mass by means of one or more first resilient elements which are preferably connected to the inner region of the drive mass facing the detection mass and which are arranged thereon and by means of one or more second resilient elements which are arranged at the outer region of the drive mass facing away from the detection mass. Owing to such resilient geometry, only three movement modes of the drive masses relative to the detection mass are ideally possible, that is to say, the primary movement as the excited movement preferably in the form of a translatory oscillation in a radial direction, in each case in phase opposition with respect to the opposing drive mass, secondary movements in the form of torsional movements about the Y and Z axis for drive masses with a primary movement in the direction of the X axis and secondary movements in the form of torsional movements about the X and Z axis for drive masses with a primary movement in the direction of the Y axis. Advantageously, all other movement possibilities are substantially completely prevented or limited to the greatest possible extent owing to the above resilient geometry. This particularly applies to two parasitic main modes which will be further discussed here specifically.

Firstly, the resonance peak of an in-phase oscillation of two opposing drive masses is intended to be eliminated, if possible, from the XY plane (butterfly mode). This can be carried out, for example, in that the resonance frequency of that parasitic oscillation is as far as possible above the resonance frequency of the primary movement of the drive masses. In the present case, this is achieved in that the drive mass is arranged on the detection mass with resilient elements at the inner region, on the one hand, and with resilient elements at the outer region on the other hand. There is thereby produced a resonance frequency range displacement out of the range of the primary movements.

Secondly, secondary movements in the form of rotational oscillations about the axis in the movement direction of the primary movement are intended to be minimised or substantially completely prevented. This is preferably achieved by using two resilient elements which are as remote as possible from the corresponding movement axis and which exert sufficient resistance to such rotation of the drive masses about the respective coordinate axes.

In a particularly advantageous embodiment of the invention, at least one, preferably each, drive mass has a passage which extends in a radial direction and which is open at least at one side but preferably at both sides. There is arranged in the passage a substantially flexurally rigid structure, preferably in the form of a bar structure, with which the first resilient element connected to the inner region of the drive mass facing the detection mass is connected to the second resilient element which is arranged at the outer region of the drive mass facing away from the detection mass.

According to another embodiment, at least one, preferably each, drive mass has a recess for receiving at least one of the resilient elements. The recess is preferably arranged in the outer region of the drive mass facing away from the detection mass. It is preferably open towards the detection mass by means of the passage via the inner region of the drive mass facing the detection mass. The at least one resilient element arranged in the recess is connected to the other resilient element by means of the bar structure arranged in the passage. The other resilient element is preferably arranged in an intermediate space present between the drive mass and the detection mass and, to that end, the drive mass can also have another recess.

The drive elements are preferably driven electrostatically, for example, by voltages being applied to finger electrodes, piezoelectrically or magnetically by a magnetic field being coupled. According to another proposal, the Coriolis rate of rotation sensor has at least one drive for producing a primary movement of a drive mass, preferably respectively one drive for each drive mass. The drive brings about the primary movement as a relative movement between the drive mass and substrate. In a particularly advantageous manner, the drive has, per drive mass, a comb-like electrode which is preferably arranged on the drive mass and which co-operates with a comb-like counter-electrode which is arranged on the substrate. A counter-electrode can be fixed to the substrate directly or indirectly by means of anchoring structures. The same applies to the electrodes, which can also be fixed to the drive mass directly or indirectly. By an alternating-current voltage being applied, an electrostatic force is induced between the electrodes and counter-electrodes so that the respective drive mass is deflected relative to the substrate. If an electrical alternating-current voltage is applied in the region of the mechanical resonance frequency of a drive mass, a large deflection in the range from 0.1 to 100 μm can also be achieved with a low damping coefficient (for example, under a vacuum) with relatively small voltage amplitudes. The construction elements of the electrostatic drive such as anchoring structures, electrodes and counter-electrodes are preferably constructed in such a manner that they are distorted neither by the electrostatic force applied nor by the inertial forces occurring during primary or secondary movements of the drive mass.

In order to be able to adapt and adjust the primary and secondary movements of the drive masses relative to each other, the drive masses can preferably be connected to each other, preferably by means of coupling springs. The coupling springs are intended to ensure or ensure that the drive masses oscillate simultaneously in phase opposition during the primary movement. By the drive masses being connected to each other, they are constructed practically as a connected drive mass which preferably has only one main oscillation mode and consequently only one resonance frequency. Owing to those connection springs between the drive masses, it is possible for the primary mode and the three secondary modes to constitute the lowest resonance frequencies. In particular, movements during which at least two drive masses move in a parallel manner or in phase are practically completely prevented because the resonance frequency thereof is substantially higher than the four above-mentioned operating frequencies. Since such parallel movement patterns occur in the event of acceleration in the XY plane, the sensor has good robustness with respect to shocks and vibration resistance. In a particularly advantageous manner, the connection springs are in the form of folded or U-like resilient elements.

Other structures which, for example, increase or influence the mechanical stability of the system involving the drive masses/connection springs, can be fitted to the drive masses in addition to the connection springs. For example, there may be provided on the connection springs, in the case of U-like connection springs in particular at the reversal point, and/or in a different manner indirectly on the drive masses, a peripheral annular structure which connects the connection springs to each other and synchronises the mechanical characteristics thereof. Another possibility for influencing the mechanical characteristics of the system involving the drive masses/connection springs are external springs which are preferably secured to the substrate by means of external anchors. The external springs can be arranged on the drive masses and/or on the connection springs and can influence the movement possibilities thereof relative to the substrate in a selective manner.

According to another proposal of the invention, a rate of rotation sensor according to the invention has at least two first electrode pairs for detecting the pivoting thereof about X, at least two second electrode pairs for detecting the pivoting thereof about Y and at least two third electrode pairs for detecting the pivoting thereof about Z. Each electrode pair comprises in each case a counter-electrode arranged on the substrate and an electrode arranged on the detection mass. Respectively, one electrode pair is arranged at one side of the detection mass and the remaining electrode pair is arranged at the opposite side (of the detection mass and the origin of the reference coordinate system). In order to improve the measurement resolution, according to another proposal, the capacitance change at an electrode/counter-electrode does not need to be measured, but instead the differential capacitance of two mutually associated electrode pairs can be detected so that the absolute capacitance value is not significant. To that end, it is further provided that the electrode pairs are connected to each other in such a manner that the differential capacitances can be detected. In the rest position of the detection mass, the difference of the capacitance values of mutually associated electrode pairs (in each case comprising an electrode and a counter-electrode), that is to say, electrode pairs opposite each other, is zero. If there is deflection of the detection mass owing to a detection movement, the capacitance of the first electrode pair increases whilst that of the complementary electrode pair decreases accordingly so that the capacitance difference increases to twice the value of the respective change in capacitance.

In order to be able to ensure detection of the detection movements in all three spatial directions, in each embodiment of the sensor according to another proposal of the invention, at least one electrode pair may be in the form of finger electrodes which cooperate with corresponding finger counter-electrodes on the substrate. It is further possible to construct at least one electrode pair in the form of surface electrodes which are arranged between the detection mass and the substrate and/or between the detection mass and a counter-substrate constructed at the side facing away from the substrate and which have corresponding surface counter-electrodes on the substrate or counter-substrate. Mutually opposing finger electrodes are preferably arranged at both sides of the detection mass.

The present invention further relates to an inertial measurement unit (IMU) which has a rate of rotation sensor according to the present invention. In a particularly advantageous manner, the acceleration measurement unit may comprise acceleration sensors in order to detect linear accelerations in each of the one, two or three spatial directions in addition to the 3D rate of rotation sensor according to the invention. The acceleration measurement unit may be constructed as a chip with conventional construction and connection technology together with corresponding ASIC in a plastics, metal or ceramic housing, for example, in the form of a hybrid construction, by means of wire bonding, flip chip technology, etc. A monolithic integration of the MEMS technology and the ASIC technology is also conceivable.

Finally, the present invention relates to a method for detecting rates of rotation in three mutually orthogonal spatial directions, preferably using a sensor according to one of the embodiments or claims described herein, at least four drive masses preferably in the form of a first, second, third and fourth drive mass each being excited to produce a translatory oscillation as the primary movement, at least two drive masses carrying out the primary movement perpendicular to the primary movement of at least two other drive masses, a secondary movement of at least one drive mass caused by Coriolis force being transmitted to the detection mass when an external rate of rotation to be detected is effective, and the detection mass being able to carry out rotational oscillations in three mutually orthogonal spatial directions (X, Y, Z) relative to the substrate. Drive masses which are arranged opposite each other with a detection mass interposed preferably oscillate simultaneously in phase opposition. In a particularly advantageous manner, the resonance frequencies of the primary and secondary movements of the drive mass and the detection mass are further in a range from 1.0 kHz to 50.0 kHz, preferably in a range from 5 kHz to 30.0 kHz, more preferably in a range from 10.0 kHz to 12.0 kHz and are particularly preferably 11.0 kHz. The resonance frequencies of other movement modes can be at a higher frequency range in all embodiments so that disruptive coupling can be substantially completely avoided.

BRIEF DESCRIPTION OF THE DRAWINGS

Other advantages and features of the present invention will be appreciated from the following non-limiting description of exemplary embodiments with reference to the Figures, in which.

DETAILED DESCRIPTION OF THE INVENTION

Figure 1:
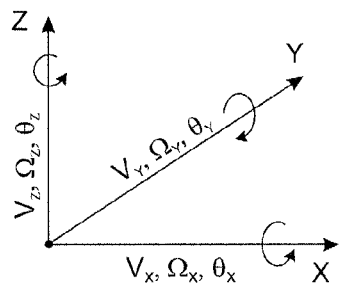
FIG. 1 is a schematic illustration of the reference coordinate system used to describe arrangements and orientations relative to the sensor.

In the orthogonal coordinate system which is illustrated in FIG. 1 and which is used as the reference system in the above general description of the invention and the description below of preferred embodiments in order to clearly set out arrangements and orientations relative to the sensor, the velocity vectors ($V_i$), the external rates of rotation ($\Omega_i$), the rotation angle ($\theta_i$) about the respective axis and the positive direction of rotation are indicated in addition to the references X, Y and Z for the three spatial axes. The coordinate system is indicated in most of the remaining Figures for the purpose of greater clarity in addition to the respective illustrations of the sensor. However, it is arranged relative thereto in such a manner that its origin coincides with the central anchoring point 1 of the sensors, the X-Y plane extends parallel with the substrate and the Z axis extends orthogonally thereto.

Figure 2:
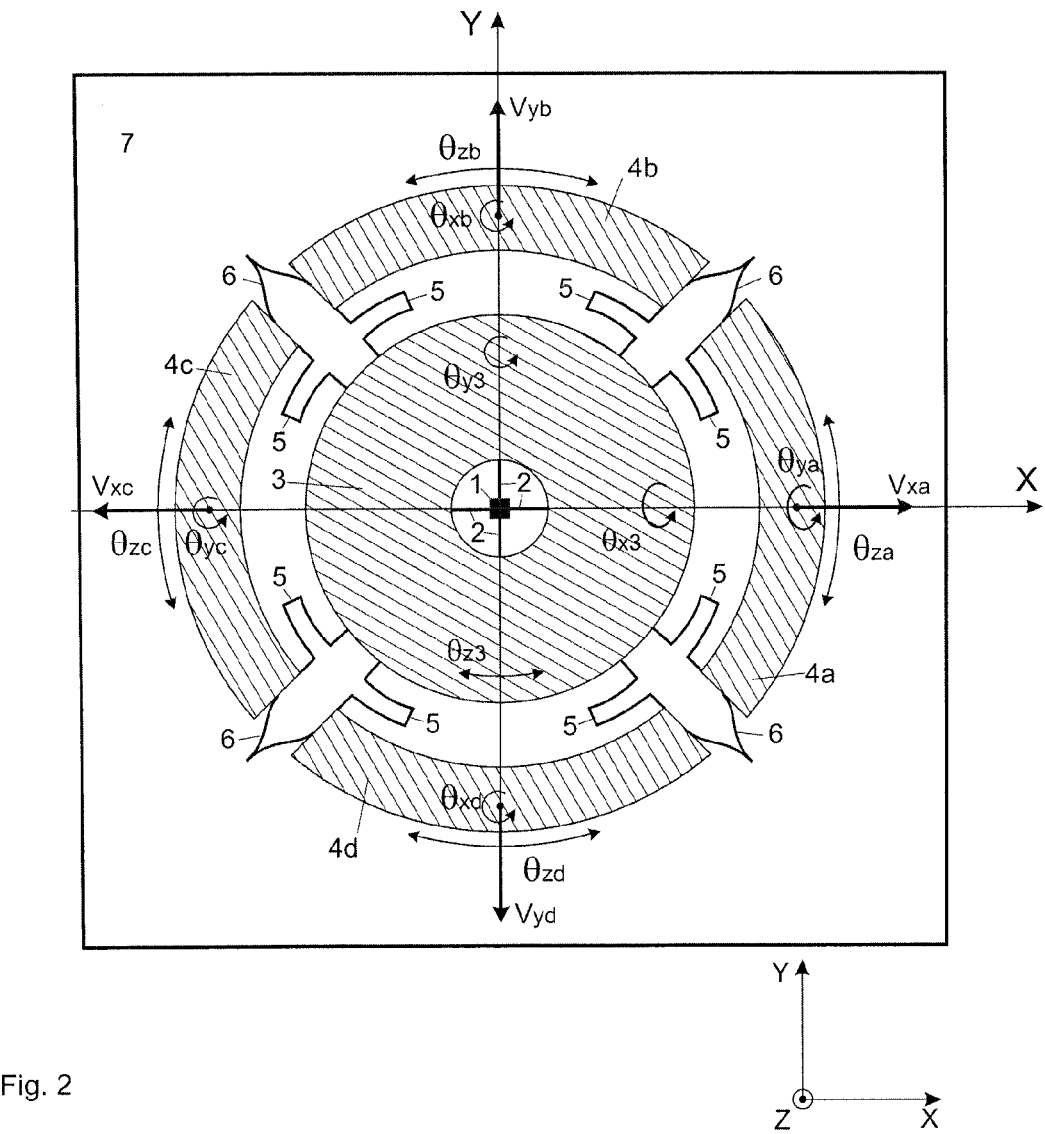
FIG. 2 is a schematic top view of a Coriolis rate of rotation sensor in the direction of the negative Z axis towards the X-Y plane.

FIG. 2 illustrates an embodiment of the Coriolis rate of rotation sensor. The Figure is a top view of the X-Y plane parallel with the substrate in the negative Z direction. The sensor of FIG. 2 is illustrated in the same manner in FIGS. 3, 4 and 5, the last Figures showing it when an external rate of rotation about the X axis, Y axis and Z axis is present, respectively. Therefore, the same elements of the sensor are referred to using the same reference numerals in the Figures.

The sensor of the preferred embodiment has a central anchor 1 which connects a detection mass 3 via radially arranged resilient elements 2 to the substrate 7 which is arranged parallel with the plane of the detection mass 3. The resilient elements 2 between the central anchor 1 and the detection mass 3 are constructed in such a manner that the detection mass 3 substantially has three degrees of freedom of movement. It is capable of carrying out rotational movements about the X axis, the Y axis and the Z axis. Translatory movements of the detection mass 3 are substantially completely prevented by the resilient elements 2.

Resilient elements 5 are arranged in a radial direction at the outer edge of the detection mass 3. The detection mass 3 is connected thereby to four drive masses 4a, 4b, 4c, 4d in the embodiment illustrated. The drive masses 4a, 4b, 4c, 4d are arranged radially around the detection mass 3.

The drive masses 4a, 4b, 4c, 4d are connected to each other via connection springs 6, a connection spring 6 being arranged between each set of two drive masses 4a, 4b, 4c, 4d. The connection springs 6 serve to mechanically couple the drive masses 4a, 4b, 4c, 4d to each other so that, in a suitable geometric construction, the drive masses 4a, 4b, 4c, 4d can be regarded as a mechanical unit with defined movement modes and inherent frequencies.

Figure 6:
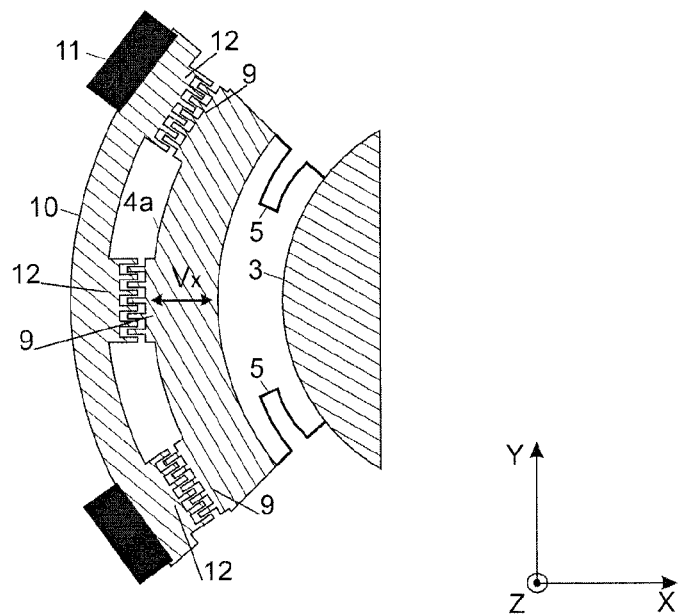
FIG. 6 is an enlarged cut-out of the drive unit of the sensor in accordance with FIGS. 2 to 5.

The drive masses 4a, 4b, 4c, 4d are displaced with primary oscillation by means of capacitive drives which are illustrated by way of example with reference to the drive mass 4a to an enlarged scale in FIG. 6. The drives each have a counter-electrode 10 which is arranged securely on the substrate 7 by means of external anchors 11. The counter-electrode 10 has counter-electrode combs 12 which are directed radially inwards in the direction of the central anchor 1 and whose electrode fingers are orientated in a radial direction towards the origin of the reference coordinate system. The counter-electrode combs 12 engage with each other by means of an electrode comb 9. They are arranged in a radial direction at the outer periphery of the drive masses 4a, 4b, 4c, 4d. The distances between the electrodes and counter-electrodes are selected in such a manner that the drive mass can carry out its primary movement and all the secondary movements without contact occurring between the electrode comb 9 and counter-electrode-comb 12.

By an alternating-current voltage being applied between the electrode comb 9 and counter-electrode-comb 12, there is induced an electrostatic force by means of which the drive mass is deflected relative to the counter-electrode 10 in the form of the primary movement thereof. If the electrical alternating-current voltage is applied in the region of the mechanical resonance frequency $f_R$, it is also possible to achieve a large deflection in a range from 0.1 to 100 µm at relatively small voltage amplitudes with a low damping coefficient (for example, under a vacuum). All the construction elements, that is to say, the counter-electrode 10, the external anchors 11 and the drive masses 4a, 4b, 4c, 4d are configured in such a manner that they are not distorted either by the electrostatic forces applied or by primary or secondary movements.

The drives of the remaining drive masses 4b, 4c and 4d are constructed identically to the above-described drive of the drive mass 4a.

Each drive mass 4a, 4b, 4c, 4d is driven individually by means of a drive constructed in that manner. This is carried out in such a manner that each drive mass 4a, 4b, 4c, 4d carries out primary oscillation in a radial direction. The simultaneous movement direction of the drive masses 4a, 4b, 4c, 4d is mutually coordinated in such a manner that they move either simultaneously radially outwards, that is to say, away from the central anchor 1, or radially inwards, that is to say, towards the central anchor 1. The drive mass 4a thus moves radially in the direction of the positive X axis ($V_{Xa}$) and the drive mass 4c moves radially in a negative X direction ($V_{Xc}$), the drive mass 4b moves radially in a positive Y direction ($V_{Yb}$) and the drive mass 4d finally moves in a negative Y direction ($V_{Yd}$). The drive masses 4a, 4b, 4c, 4d carry out radial oscillation in phase opposition. The design of the sensor is such that that drive mode in phase opposition has the lowest resonance frequency of all possible movement modes and the other secondary modes are higher.

Figure 3:
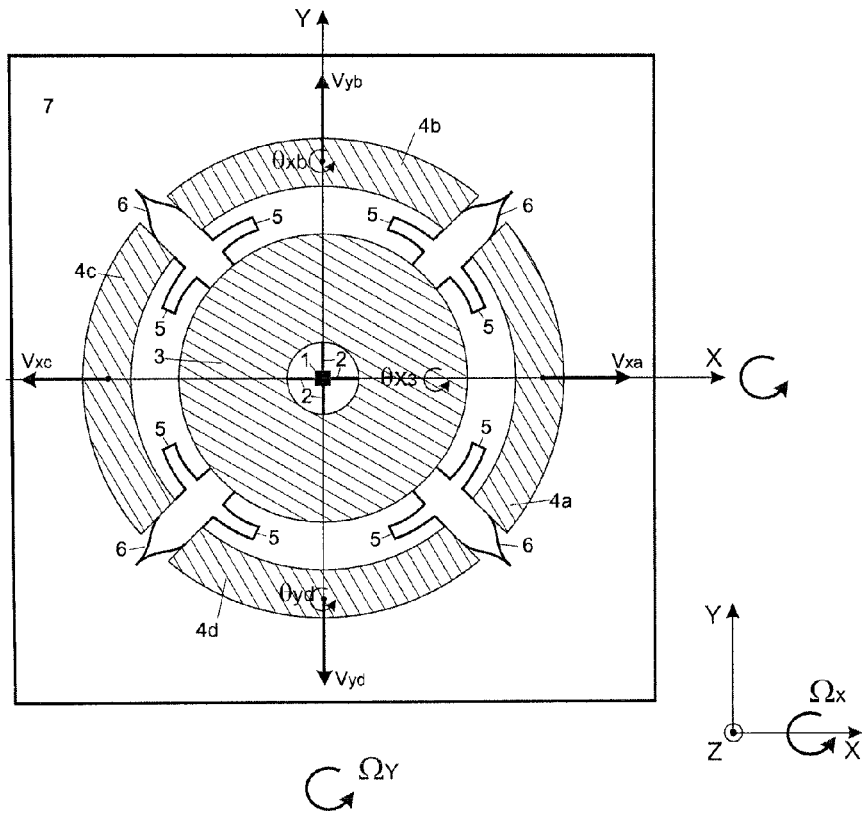
FIG. 3 is a view corresponding to FIG. 2 when an external rate of rotation acts about the X axis.
Figure 4:
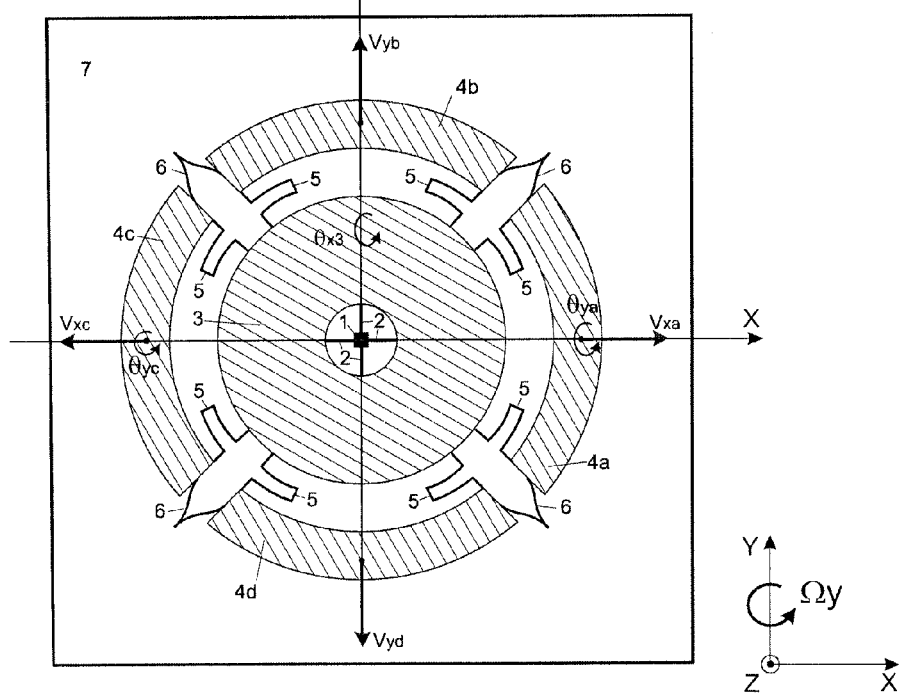
FIG. 4 is a view corresponding to FIG. 2 when an external rate of rotation acts about the Y axis.

If an external rate of rotation $\Omega$ is present, owing to the primary oscillations $V_{Xa}$, $V_{Yb}$, $V_{Xc}$, $V_{Yd}$ of the drive masses 4a, 4b, 4c, 4d caused by the Coriolis effect torques act on those drive masses. FIG. 3 illustrates the action of an external rate of rotation $\Omega_X$ about the X axis. The drive masses 4a, 4b, 4c, 4d carry out the above-described primary movements $V_{Xa}$, $V_{Yb}$, $V_{Xc}$, $V_{Yd}$ in the form of radial oscillations in the direction of the X or Y axis. The external rate of rotation $\Omega_X$ results in a rotation of the entire system about the X axis and brings about oscillating rotational movements $\theta_{Xb}$, $\theta_{Xd}$ of the drive masses 4b, 4d about the X axis as the secondary movement thereof. Since the drive masses 4b, 4d apply primary movements $V_{Yb}$, $V_{Yd}$ in phase opposition, the secondary movements $\theta_{Xb}$, $\theta_{Xd}$ thereof are also in phase opposition. This means that the drive mass 4d oscillates out of the X-Y plane in the direction of the negative Z axis during a period of time in which the drive mass 4b oscillates out of the X-Y plane illustrated in the direction of the positive Z axis.

The external rate of rotation $\theta_X$ does not bring about any secondary movements with respect to the drive masses 4a, 4c because the direction thereof corresponds to the direction of the primary movements $V_{Xa}$ and $V_{Xc}$ of the drive masses 4a and 4c and there is no occurrence of Coriolis forces owing to the relationship of the Coriolis force as a cross-product $F_c=2m(v \times \Omega)$. This results in the drive masses 4a, 4c only carrying out their primary movements $V_{Xa}$ and $V_{Xc}$ and not secondary movements when an external rate of rotation $\Omega_X$ acts about the X axis.

The secondary movements $\theta_{Xb}$, $\theta_{Xd}$ of the drive masses 4b, 4d are transmitted to the detection mass 3 by means of the resilient elements 5. Since it can carry out rotational movements about all three spatial axes X, Y, Z owing to the central suspension by means of the resilient elements 2 and the central anchor 1, it oscillates in an excited manner owing to the secondary movements $\theta_{Xb}$ and $\theta_{Xd}$ about the X axis. That movement of the detection mass 3 is referred to below as the detection movement $\theta_{X3}$. The magnitude of the deflection of the detection movement $\theta_{X3}$ is detected capacitively—as will be described below—and is directly proportional to the external rate of rotation $\Omega_X$ as a first approximation.

Similarly to what has been described above, an external rate of rotation $\Omega_Y$ about the Y axis results in secondary movements $\theta_{Ya}$ and $\theta_{Yc}$ of the drive masses 4a and 4c about the Y axis, respectively. A Coriolis force is not applied to the drive masses 4b, 4d because the external rate of rotation $\Omega_Y$ is in the same direction as the primary movements $V_{Yb}$ and $V_{Yd}$ of the drive masses 4b, 4d. The secondary movements $\theta_{Ya}$ and $\theta_{Yc}$ of the drive masses 4a, 4c are transmitted to the detection mass 3 by means of the resilient elements 5, as a result of which the detection mass 3 is excited to produce detection movement $\theta_{Y3}$ in the form of a rotational oscillation about the Y axis. The magnitude of the deflection of the detection movement $\theta_{Y3}$ of the detection mass 3 is again directly proportional to the external rate of rotation $\Omega_Y$ and can be detected capacitively.

Figure 5:
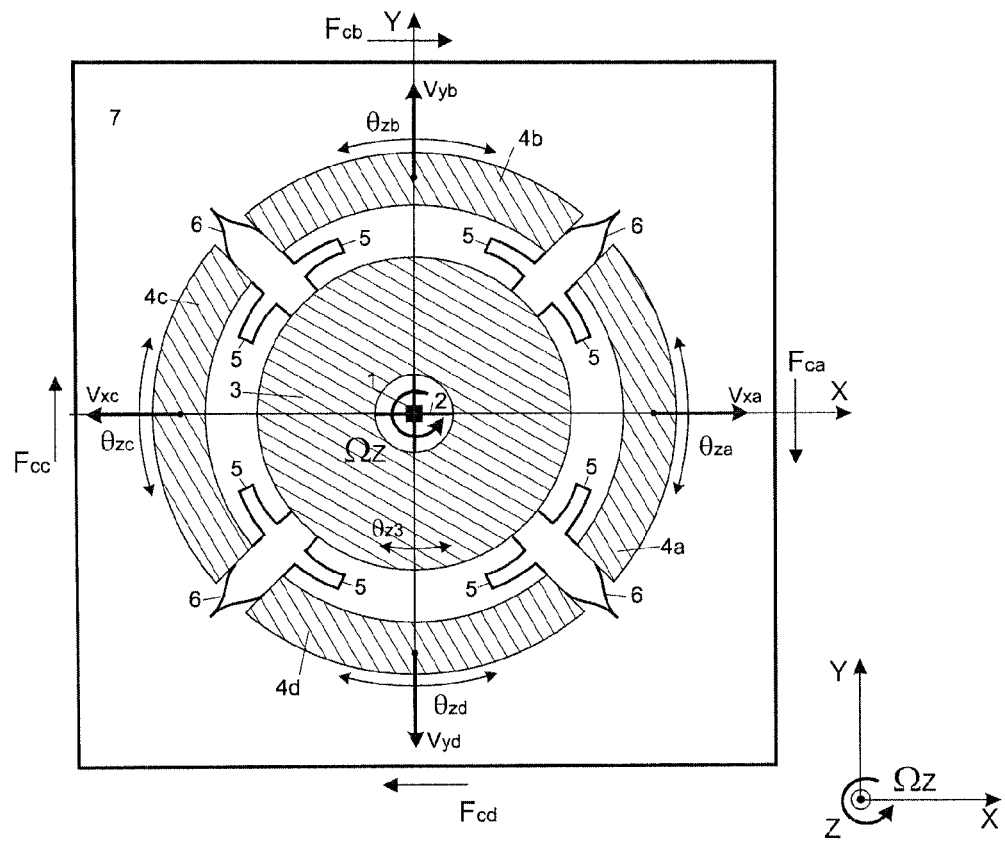
FIG. 5 is a view corresponding to FIG. 2 when an external rate of rotation acts about the Z axis.

FIG. 5 illustrates the effect of an external rate of rotation $\Omega_Z$ about the Z axis. Since the external rate of rotation $\Omega_z$ is orthogonal relative to all the primary movements $V_{Xa}$, $V_{Yb}$, $V_{Xc}$ and $V_{Yd}$, a Coriolis force is applied to each drive mass 4a, 4b, 4c, 4d. Owing to the cross-relationship $F_c=(V \times \Omega)$, there is applied, in the case of primary movements $V_{Xa}$, $V_{Yb}$, $V_{Xc}$, $V_{Yd}$, which extend in a positive axial direction, a Coriolis force in the negative Y direction to the drive mass 4a, a Coriolis force in the positive Y direction to the drive mass 4c, a Coriolis force in the negative X direction to the drive mass 4b and a Coriolis force in the positive X direction to the drive mass 4d. In the event of a reversal of movement of the primary movements $V_{Xa}$, $V_{Yb}$, $V_{Xc}$, $V_{Yd}$, that is to say, if the distance of the drive masses 4a, 4b, 4c, 4d from the central anchor 1 is reduced, there results a reversal in the preceding sign of the above-described Coriolis forces. For the first case mentioned, the Coriolis forces acting on the drive masses 4a, 4b, 4c, 4d are indicated in FIG. 5. It can clearly be seen that the Coriolis forces become combined overall to form a torque which acts on the drive masses 4a, 4b, 4c, 4d in the clockwise direction in the case of an increase in distance from the central anchor 1, whereas in the converse situation a torque in the counter-clockwise direction results. Owing to the Coriolis forces acting, the drive masses 4a, 4b, 4c, 4d carry out secondary movements in the form of rotational oscillations $\theta_{Za}$, $\theta_{Zb}$, $\theta_{Zc}$ and $\theta_{Zd}$ about the Z axis. Those secondary movements are transmitted to the detection mass 3 owing to the action of the resilient elements 5, as a result of which the detection mass 3 is excited to carry out a detection movement in the form of a rotational oscillation $\theta_{Z3}$ about the Z axis. The detection movement $\theta_{Z3}$ of the detection mass 3 is directly proportional to the external rate of rotation $\Omega_Z$ and can again be detected capacitively.

Generally, external rates of rotation $\Omega_X$, $\Omega_Y$ and $\Omega_Z$ result in detection movements $\theta_{X3}$, $\theta_{Y3}$ and $\theta_{Z3}$ of the detection mass 3 in the form of rotational oscillations about the respective axes X, Y and Z. A particular advantage of the embodiment illustrated is that all the detection modes of the primary movements are mechanically decoupled. For instance, there results owing to the opposing arrangement of the drive masses 4a, 4b, 4c, 4d and the primary movements thereof extending in phase opposition—the drive mass 4a carries out its primary movement $V_{Xa}$ in phase opposition to the primary movement $V_{Xc}$ of the drive mass 4c and the drive mass 4b carries out its primary movement $V_{Yb}$ in phase opposition to the primary movement $V_{Yd}$ of the drive mass 4d—mutual neutralisation of the forces and moments caused by the opposing primary movements. Centripetal and centrifugal forces acting on the drive masses 4a, 4b, 4c, 4d are also mutually cancelled out by the opposing arrangement. The resonance frequency $f_R$ of the system formed from the drive masses 4a, 4b, 4c, 4d, the resilient elements 5 and the connection springs 6 preferably has a value of 11 kHz in the embodiment illustrated. The drive masses 4a, 4b, 4c, 4d oscillate at an amplitude of approximately 10 µm at a quality factor of 10,000. The resonance frequencies $f_{3X}$, $f_{3Y}$, $f_{3Z}$ of the detection mass 3 in relation to rotational oscillations about the three axes X, Y and Z are in a similar range, that is to say, preferably between approximately 10.0 and 12.0 kHz. Owing to those resonance frequencies of the system comprising drive masses 4a, 4b, 4c, 4d, resilient elements 5 and connection springs 6 on the one hand ($f_R$) and the detection mass 3 ($f_{3X}$, $f_{3Y}$, $f_{3Z}$) on the other hand being located close together, good transmissibility of the secondary movements of the drive masses 4a, 4b, 4c, 4d to the detection mass 3 is ensured in the form of the detection movements thereof. Practically identical resonance frequencies would be ideal for maximum transmissibility but time-dependent rates of rotation would then result in a signal which is greatly reduced and therefore distorted. The bandwidth would therefore be very small.

The resilient elements 5 which connect the drive masses 4a, 4b, 4c, 4d to the detection mass 3 are constructed in such a manner that only three movement modes of the drive masses 4a, 4b, 4c, 4d are possible relative to the detection mass 3. In the case of the drive masses 4a and 4c, they are the primary movements $V_{Xa}$ and $V_{Xc}$ in the radial direction which are in phase opposition to each other and the secondary movements in the form of torsion movements $\theta_{Ya}$ and $\theta_{Yc}$ about the Y axis and in the form of torsion movements $\theta_{Za}$ and $\theta_{Zc}$ about the Z axis, respectively.

Similarly, the drive masses 4b and 4d can also carry out only three movement modes relative to the detection mass 3. These are the primary movements $V_{Yb}$ and $V_{Yd}$ in a radial direction relative to the central anchor and in phase opposition to each other and the secondary movements in the form of torsion movements $\theta_{Xb}$ and $\theta_{Xd}$ about the X axis and in the form of radial oscillations $\theta_{Zb}$ and $\theta_{Za}$ about the Z axis.

All other movement modes of the drive masses 4a, 4b, 4c, 4d are prevented or limited to the greatest possible extent by the geometry and construction of the resilient elements 5. Particularly important in this instance is the suppression of two parasitic main modes, that is to say, rotation of the drive masses 4a and 4c about the X axis and the drive masses 4b and 4d about the Y axis on the one hand and in-phase oscillation of the drive masses 4a and 4c and 4b and 4d out of the X-Y plane in the direction of the Z axis (also referred to as butterfly mode).

In the embodiment of the sensor illustrated in FIGS. 2 to 6, the first parasitic main mode mentioned is minimised in that two resilient elements 5 which are arranged as far as possible from the X axis are used to connect the drive masses 4a and 4c to the detection mass 3 and two resilient elements 5 which are as far as possible from the Y axis are used to connect the drive masses 4b and 4d to the detection mass 3.

Figure 7:
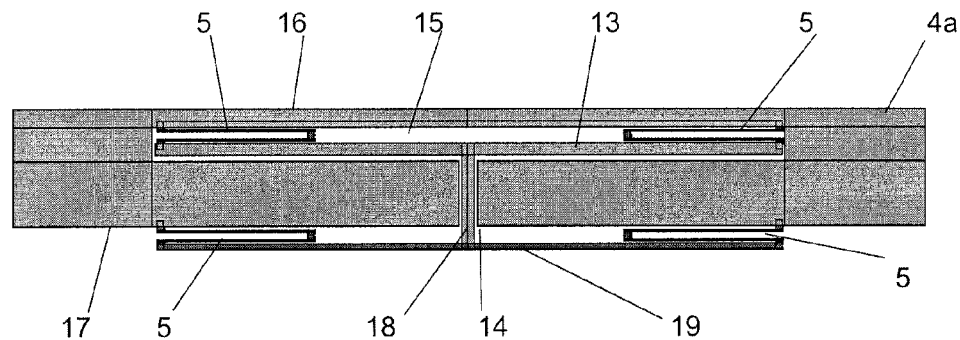
FIG. 7 is a top view towards the X-Y plane of another embodiment of a drive mass of the sensor.
Figure 9:
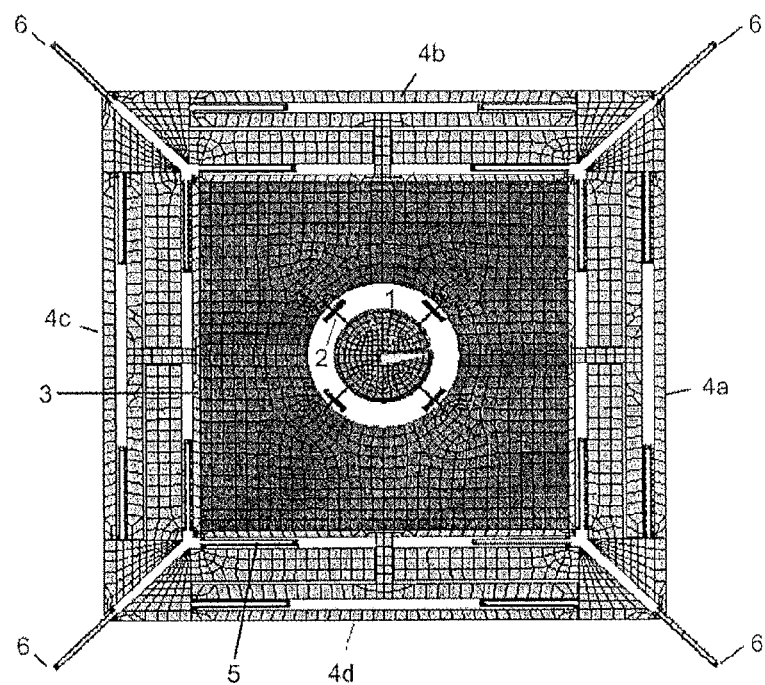
FIG. 9 is a top view towards the X-Y plane in the direction of the negative Z axis of another embodiment of the sensor.
Figure 10:
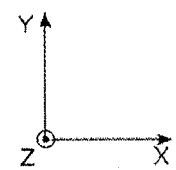
FIG. 10 is an enlarged cut-out from the corner region of the sensor of FIG. 9
Figure 10:
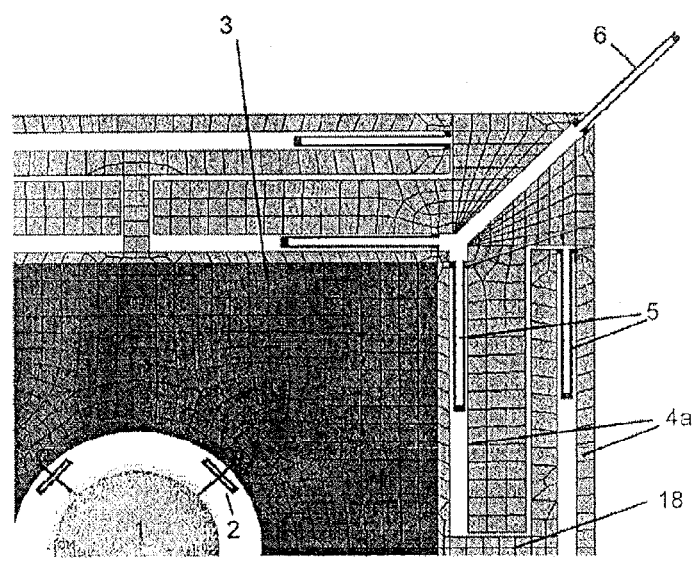

The second parasitic main mode mentioned can be counteracted by the construction of the resilient elements 5 illustrated in detail in FIG. 7 and the drive masses 4a, 4b, 4c, 4d, wherein FIG. 7 illustrates another embodiment of the drive mass 4a, which can be used with the sensor of FIGS. 2-6 or with the sensor of FIGS. 9 and 10. The drive mass 4a illustrated in FIG. 7 by way of example is connected to the detection mass 3 by means of a total of four resilient elements 5. In the outer region 16 thereof, it has a recess 15 which is open via a radially extending passage 14 towards the inner region 17 directed towards the detection mass 3. Two resilient elements 5 are arranged in the recess 15 so as to be as far as possible from the X axis extending through the passage 14. Those two resilient elements 5 are connected to each other by means of a connection structure 13, the connection structure in turn being connected to another connection structure 19 at the inner region 17 of the drive mass 4a by means of a bar element 18 which engages through the passage 14. That connection structure 19 is in turn connected at the end side to the other two resilient elements 5 which are arranged as far as possible from the X axis and which are again arranged at the inner region 17 of the drive mass 4a.

Both above-mentioned parasitic main modes are successfully prevented by the four-point arrangement of the drive mass 4a illustrated in FIG. 7 by means of the four resilient elements 5. The arrangement of the resilient elements 5 as far as possible from the X axis prevents the rotational oscillation about the X axis mentioned, whilst the arrangement of the springs at the outer region on the one hand and at the inner region on the other hand prevents the in-phase oscillation out of the X-Y plane (butterfly mode) which is present in the form of torsional oscillation about the Y axis in the drive mass 4a illustrated. The remaining drive masses 4b, 4c, 4d can be supported in the same manner.

Figure 8:
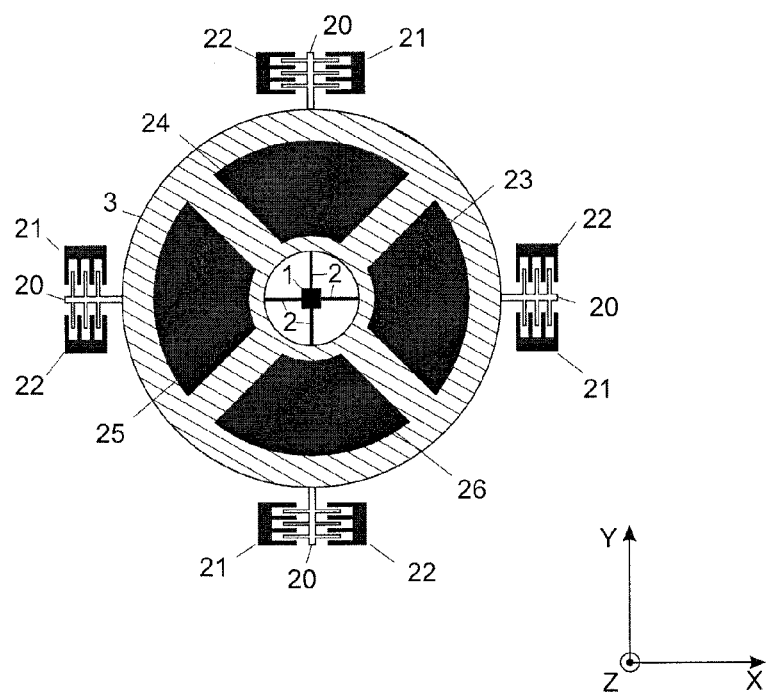
FIG. 8 is a schematic illustration of the arrangement of detection units.

FIG. 8 illustrates one possible embodiment of a detection mechanism. A total of four electrode pairs 23 to 26 are arranged between the detection mass 3 and the substrate 7. The electrode pairs 23 and 25 are positioned in the region of the X axis and the electrode pairs 24 and 26 are positioned in the region of the Y axis. The electrode pairs 23 and 25 serve to detect a detection movement of the detection mass 3 about the Y axis, that is to say, to detect the rotational oscillation $\theta_{Y3}$ thereof about the Y axis. However, the electrode pairs 24 and 26 serve to detect the detection movement of the detection mass 3 about the X axis, that is to say, to detect the rotational oscillation $\theta_{X3}$ about the X axis. By using additional function layers or a correspondingly constructed counter-substrate, which are not illustrated in the exemplary Figures, electrode pairs can be constructed above the detection mass additionally or alternatively.

In order to be able to detect the detection movements of the detection mass 3 about the Z axis in the form of rotational oscillations $\theta_{Z3}$, four finger electrodes 20 are arranged at the outer periphery of the detection mass 3. The finger-like electrodes of the finger electrodes 20 extend tangentially relative to the central anchor 1. The finger electrodes 20 are in engagement with counter-finger-electrodes 21, 22 which are also arranged tangentially relative to the central anchor 1. Although, in the embodiment illustrated, the use of four finger electrodes 20 having a corresponding number of counter-finger-electrodes 21, 22 is illustrated, any number of arrangements comprising one finger electrode 20 and two counter-finger-electrodes 21, 22 can be arranged on the detection mass 3.

There are generally very small capacitance changes at that location owing to the small structural sizes which are typical for MEMS and small deflections. The measurement resolution is substantially improved if measurement is carried out not for the capacitance change at an electrode but instead for the differential capacitance of two suitably arranged electrode pairs so that the absolute capacitance value is insignificant. The arrangement of the detection mechanism illustrated in FIG. 8 serves to detect the differential capacitance in that manner. In the rest position of the detection mass 3, that is to say, if no external rate of rotation $\Omega_X$, $\Omega_Y$, $\Omega_Z$ acts on the sensor, a value of zero is assigned to the differential capacitance. In the event of deflection, that is to say, if a detection movement of the detection mass 3 is present, relative to the substrate 7 owing to an external rate of rotation $\Omega_X$, $\Omega_Y$, $\Omega_Z$, the differential capacitance increases or decreases in accordance with the direction of rotation of the detection mass 3.

FIGS. 9 and 10 illustrate another embodiment of the rate of rotation sensor according to the invention. The sensor substantially corresponds to the embodiment illustrated in FIGS. 2 to 8, but in contrast thereto has a basic shape which is rectangular in the X-Y plane.

Figure 11:
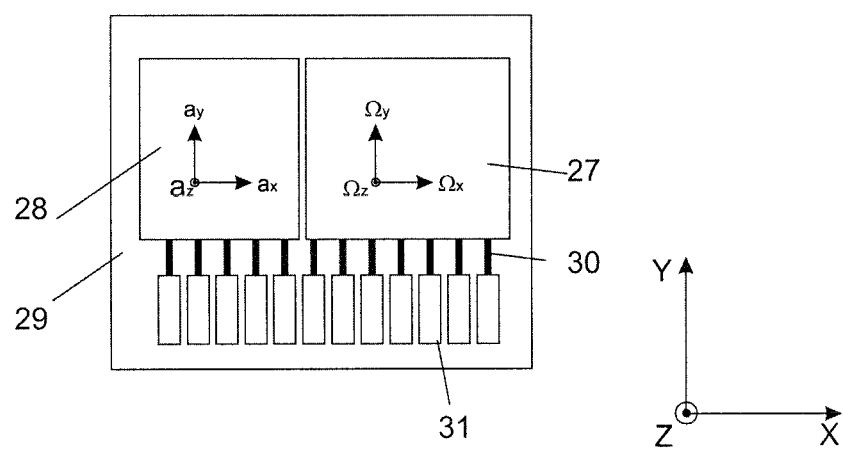
FIG. 11 is a schematic illustration of a combination of a 3D Coriolis rate of rotation sensor with a 3D acceleration sensor at the chip level as an inertial measurement unit (IMU).

FIG. 11 shows a combination of a 3D Coriolis rate of rotation sensor 27 according to the invention with a 3D acceleration sensor 28 on a MEMS silicon chip 29. The 3D rate of rotation sensor 27 and the 3D acceleration sensor 28 together form a complete IMU. External rates of rotation $\Omega_X$, $\Omega_Y$, $\Omega_Z$ about all the spatial axes of the coordinate reference system are detected by means of the 3D rate of rotation sensor 27. Linear accelerations $a_X$, $a_Y$, $a_Z$ which are present in the respective axial direction are detected by means of the 3D acceleration sensor. Both sensors are connected to connection pads 31 by means of corresponding lines 30. Generally, the chip can be constructed with conventional construction and connection technology together with a corresponding ASIC in a plastics, metal or ceramic housing not illustrated in FIG. 11. Monolithic integration of the MEMS technology and the ASIC technology is also conceivable.

LIST OF REFERENCE NUMERALS

1 Central anchor
2 Resilient element
3 Detection mass
4a, b, c, d Drive mass
5 Resilient element
6 Connection spring
7 Substrate
9 Electrode comb
10 Counter-electrode
11 External anchor
12 Counter-electrode-comb
13 Connection structure
14 Passage
15 Recess
16 Outer region
17 Inner region
18 Bar element
19 Connection structure
20 Finger electrode
21 Counter-finger-electrode
22 Counter-finger-electrode
23 Electrode pair
24 Electrode pair
25 Electrode pair
26 Electrode pair
27 3D Coriolis rate of rotation sensor
28 3D acceleration sensor
29 Silicon chip
30 Lines
31 Connection pads

The invention claimed is:

1. A micromechanical Coriolis rate of rotation sensor for detecting rates of rotation ($\Omega_X$, $\Omega_Y$, $\Omega_Z$) with components about measurement axes in three mutually orthogonal spatial directions (X, Y and Z axis), comprising:
   a substrate (1);
   a detection mass (3);
   at least two drive masses (4a, 4b, 4c, 4d), the drive masses (4a, 4b, 4c, 4d) each driveable relative to the substrate to provide a primary movement ($V_{Xa}$, $V_{Yb}$, $V_{Xc}$, $V_{Yd}$), wherein the direction of the primary movement ($V_{Xa}$, $V_{Yb}$, $V_{Xc}$, $V_{Yd}$) of one of the at least two drive masses (4a, 4c) is perpendicular to the direction of the primary movement ($V_{Xa}$, $V_{Yb}$, $V_{Xc}$, $V_{Yd}$) of another of the at least two drive masses (4b, 4d);
   wherein the detection mass (3) is coupled to the drive masses (4a, 4b, 4c, 4d) in such a manner that the detection mass (3), due to a secondary movement of the drive masses (4a, 4b, 4c, 4d) due to Coriolis force under action of an external rate of rotation to be detected can be excited to perform a detection movement; and
   wherein the detection mass (3) can carry out rotational oscillations about axes of rotation in the three mutually orthogonal spatial directions (X, Y, Z) relative to the substrate as a detection movement.

2. The micromechanical Coriolis rate of rotation sensor according to claim 1, wherein the detection mass (3) is arranged on the substrate (1) or on a layer which is applied to the substrate (1).

3. The micromechanical Coriolis rate of rotation sensor according to claim 1, wherein the detection mass (3) is arranged so as to be translatory non-movable relative to the substrate (1).

4. The micromechanical Coriolis rate of rotation sensor according to claim 1, wherein the detection mass (3) is arranged by means of an internal suspension, which is arranged at the mass centre thereof, on the substrate (1).

5. The micromechanical Coriolis rate of rotation sensor according to claim 1, wherein the detection mass (3) is connected to each drive mass in such a manner that each drive mass can carry out the primary movement in a radial direction in relation to the detection mass (3).

6. The micromechanical Coriolis rate of rotation sensor according to claim 1, wherein the detection mass is connected to each drive mass in such a manner that each drive mass can carry out two secondary rotational movements in mutually orthogonal spatial directions in relation to the detection mass.

7. The micromechanical Coriolis rate of rotation sensor according to claim 1, wherein the detection mass is connected to each drive mass in such a manner that no drive mass can carry out a secondary rotational movement about a spatial direction parallel with the primary movement in relation to the detection mass.

8. The micromechanical Coriolis rate of rotation sensor according to claim 1, wherein the drive masses are arranged around the detection mass.

9. The micromechanical Coriolis rate of rotation sensor according to claim 1, wherein two drive masses are in each case arranged opposite each other with the detection mass interposed.

10. The micromechanical Coriolis rate of rotation sensor according to claim 1, wherein each drive mass is in each case connected to the detection mass by means of at least one resilient element.

11. The micromechanical Coriolis rate of rotation sensor according to claim 1, wherein at least one drive mass is in each case connected to the detection mass by means of one or more first resilient elements which are arranged at a lateral region of the drive mass facing the detection mass and by means of one or more second resilient elements which are arranged at a lateral region of the drive mass facing away from the detection mass.

12. The micromechanical Coriolis rate of rotation sensor according to claim 11, wherein at least one drive mass has, in the lateral region thereof facing away from the detection mass, a recess in which the one or more second resilient elements are arranged.

13. The micromechanical Coriolis rate of rotation sensor according to claim 12, wherein the one or more first and second resilient elements are connected to each other by means of a substantially flexurally rigid structure, which is arranged in the recess of the drive mass.

14. The micromechanical Coriolis rate of rotation sensor according to claim 13, wherein the substantially flexurally rigid structure comprises a bar structure.

15. The micromechanical Coriolis rate of rotation sensor according to claim 1, wherein the micromechanical Coriolis rate of rotation sensor is provided in an acceleration measurement unit.

16. The micromechanical Coriolis rate of rotation sensor according to claim 1, wherein the detection mass (3) is arranged by means of an internal suspension, which is arranged at the mass centre thereof, on the substrate (1) by means of a central anchor (1) and resilient elements (2) which are arranged between said anchor and the detection mass (3).

17. The micromechanical Coriolis rate of rotation sensor according to claim 1, wherein the drive masses are arranged around the detection mass and the detection mass and the drive masses are arranged in one plane.

18. A method for detecting rates of rotation in three mutually orthogonal spatial directions comprising:
    providing at least four drive masses in the form of a first drive mass (4a), a second drive mass (4b), a third drive mass (4c) and a fourth drive mass (4d);
    exciting the at least four drive masses to produce a translatory oscillation as a primary movement;
    carrying out the primary movement of at least two of the drive masses perpendicular to the primary movement of at least two other drive masses (4a, 4b, 4c, 4d), wherein a secondary movement of at least one drive mass (4a, 4b, 4c, 4d) caused by Coriolis force is transmitted to a detection mass (3) when an external rate of rotation to be detected is effective, wherein the detection mass (2) is able to carry out rotational oscillations in three mutually orthogonal spatial directions (X, Y, Z) relative to a substrate.

19. The method for detecting rates of rotation in three mutually orthogonal spatial directions according to claim 18, further comprising using a Coriolis rate of rotation sensor to detect the rates of rotation in three mutually orthogonal spatial directions.

20. An acceleration measurement unit (AMU) comprising:
    a micromechanical Coriolis rate of rotation sensor for detecting rates of rotation ($\Omega_X$, $\Omega_Y$, $\Omega_Z$) with components about measurement axes in three mutually orthogonal spatial directions (X, Y and Z axis), the micromechanical Coriolis rate of rotation sensor comprising:
    a substrate (1);
    a detection mass (3);
    at least two drive masses (4a, 4b, 4c, 4d), the drive masses (4a, 4b, 4c, 4d) each driveable relative to the substrate to provide a primary movement ($V_{Xa}$, $V_{Yb}$, $V_{Xc}$, $V_{Yd}$), wherein the direction of the primary movement ($V_{Xa}$, $V_{Yb}$, $V_{Xc}$, $V_{Yd}$) of one of the at least two drive masses (4a, 4c) is perpendicular to the direction of the primary movement ($V_{Xa}$, $V_{Yb}$, $V_{Xc}$, $V_{Yd}$) of another of the at least two drive masses (4b, 4d);
    wherein the detection mass (3) is coupled to the drive masses (4a, 4b, 4c, 4d) in such a manner that the detection mass (3), due to a secondary movement of the drive masses (4a, 4b, 4c, 4d) due to Coriolis force under action of an external rate of rotation to be detected can be excited to perform a detection movement; and
    wherein the detection mass (3) can carry out rotational oscillations about axes of rotation in the three mutually orthogonal spatial directions (X, Y, Z) relative to the substrate as a detection movement.

* * * * *